(12) United States Patent
Elgas et al.

(10) Patent No.: US 7,800,259 B2
(45) Date of Patent: Sep. 21, 2010

(54) STATOR ASSEMBLY FOR USE IN A FLUID-COOLED MOTOR AND METHOD OF MAKING THE SAME

(75) Inventors: Bernd Peter Elgas, Hilbersheim (DE); Stephen Raiser, Wiesbaden (DE)

(73) Assignee: GM Global Technology Operations, Inc., Detroit, MI (US)

( * ) Notice: Subject to any disclaimer, the term of this patent is extended or adjusted under 35 U.S.C. 154(b) by 307 days.

(21) Appl. No.: 11/746,944

(22) Filed: May 10, 2007

(65) Prior Publication Data

US 2008/0278011 A1 Nov. 13, 2008

(51) Int. Cl.
*H02K 9/00* (2006.01)
*H02K 15/02* (2006.01)

(52) U.S. Cl. .............. 310/52; 310/54; 310/58; 310/59

(58) Field of Classification Search .......... 310/54, 310/52, 58, 59
See application file for complete search history.

(56) References Cited

U.S. PATENT DOCUMENTS

| | | | |
|---|---|---|---|
| 3,567,975 A * | 3/1971 | Biesack et al. | 310/54 |
| 4,076,989 A | 2/1978 | Watson | |
| 4,208,597 A | 6/1980 | Mulach et al. | |
| 4,534,686 A | 8/1985 | Nakamura et al. | |
| 4,644,210 A | 2/1987 | Meisner et al. | |
| 4,691,131 A | 9/1987 | Nakano | |
| 4,959,570 A * | 9/1990 | Nakamura et al. | 310/54 |
| 5,091,666 A | 2/1992 | Jarczynski | |
| 5,448,118 A * | 9/1995 | Nakamura et al. | 310/54 |
| 5,616,973 A * | 4/1997 | Khazanov et al. | 310/54 |
| 5,798,587 A * | 8/1998 | Lee | 310/58 |
| 5,939,808 A * | 8/1999 | Adames | 310/89 |
| 6,515,383 B1 * | 2/2003 | Ognibene et al. | 310/52 |
| 6,633,097 B2 * | 10/2003 | Dunlap et al. | 310/54 |
| 7,002,267 B2 | 2/2006 | Raszkowski et al. | |
| 7,155,916 B2 | 1/2007 | Hobmeyr et al. | |
| 2005/0151431 A1 * | 7/2005 | Cronin et al. | 310/60 A |
| 2009/0079278 A1 * | 3/2009 | Kramer et al. | 310/54 |

* cited by examiner

*Primary Examiner*—Quyen Leung
*Assistant Examiner*—Terrance Kenerly
(74) *Attorney, Agent, or Firm*—Fraser Clemens Martin & Miller LLC; J. Douglas Miller

(57) ABSTRACT

A stator assembly for use in a fluid-cooled motor is disclosed, wherein a cooling jacket is disposed around a main body of the stator, the cooling jacket including at least one conduit adapted to receive a coolant therein, thereby minimizing a complexity and a cost of manufacture of the stator assembly, and maximizing a cooling capability of the stator assembly.

6 Claims, 2 Drawing Sheets

US 7,800,259 B2

STATOR ASSEMBLY FOR USE IN A FLUID-COOLED MOTOR AND METHOD OF MAKING THE SAME

FIELD OF THE INVENTION

The invention relates generally to stator assemblies and more particularly to stator assemblies for use in fluid cooled motors.

BACKGROUND OF THE INVENTION

An electric motor generates heat during operation. If the heat is not adequately dissipated, a performance and a reliability of the motor may be impaired. It has been an object of prior art motors to provide efficient and cost effective methods for dissipating heat generated by the motors to maximize the performance and the reliability thereof.

One such method is disclosed in commonly owned U.S. Pat. No. 7,002,267, hereby incorporated herein by reference in its entirety. The '267 patent illustrates a motor including a rotor and a stator assembly. The stator assembly, such as that disclosed in commonly owned U.S. Pat. No. 4,076,989, incorporated herein by reference in its entirety, typically includes a hollow main body portion disposed around a rotor or shaft, end plates, and a cooling means. A magnetic field generated by the stator assembly causes a rotation of the rotor to produce mechanical energy. The motor disclosed in the '267 patent includes a plurality of coolant apertures. A pressurized coolant is caused to flow through the coolant apertures to cool the stator.

The manufacture of stator assemblies can be a timely and expensive process. Typical manufacturing steps include: shrink fitting an aluminum layer having machined fluid channels onto a stator, shrink fitting a cooling jacket over the aluminum layer, and finishing the assembly with aluminum end plates. It has been a continuing challenge to minimize the complexity and cost of manufacturing stator assemblies while maximizing a performance thereof.

It would be desirable to produce a stator assembly for use in a fluid cooled motor, wherein a complexity and a cost of manufacture of the stator assembly are minimized, and a performance and a cooling capability of the stator assembly are maximized.

SUMMARY OF THE INVENTION

Harmonious with the present invention, a stator assembly for use in a fluid cooled motor, wherein a complexity and a cost of manufacture of the stator assembly are minimized, and a performance and a cooling capability of the stator assembly are maximized, has surprisingly been discovered.

In one embodiment, a stator assembly comprises a hollow main body adapted to receive a rotor therein; and a cooling jacket disposed around the main body, wherein the cooling jacket includes at least one conduit adapted to receive a coolant therein.

In another embodiment, a stator assembly for use in a fluid-cooled motor comprises: a hollow main body having a first end and a second end and adapted to receive a rotor therein; a cooling jacket disposed around the stator, wherein the cooling jacket includes at least one conduit adapted to receive a coolant therein; a first end plate disposed on the first end of the main body; and a second end plate disposed on the second end of the main body.

A method for producing a stator assembly for use in a fluid-cooled motor comprises the steps of: providing a main body having a hollow interior adapted to receive a rotor therein; and forming a cooling jacket around the main body; wherein the cooling jacket includes at least one conduit.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed and illustrated, the steps presented are exemplary in nature, and thus, the order of the steps is not necessary or critical.

Figure 1:
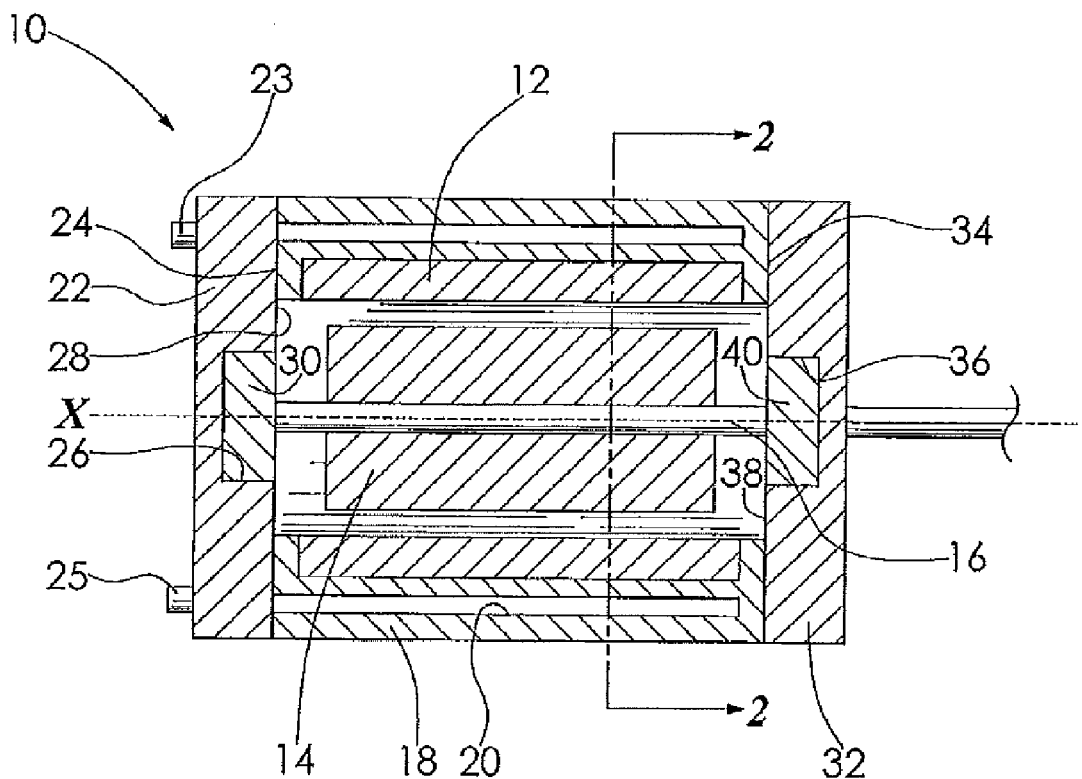
FIG. 1 is a front sectional view of a stator assembly in accordance with an embodiment of the invention.
Figure 2:
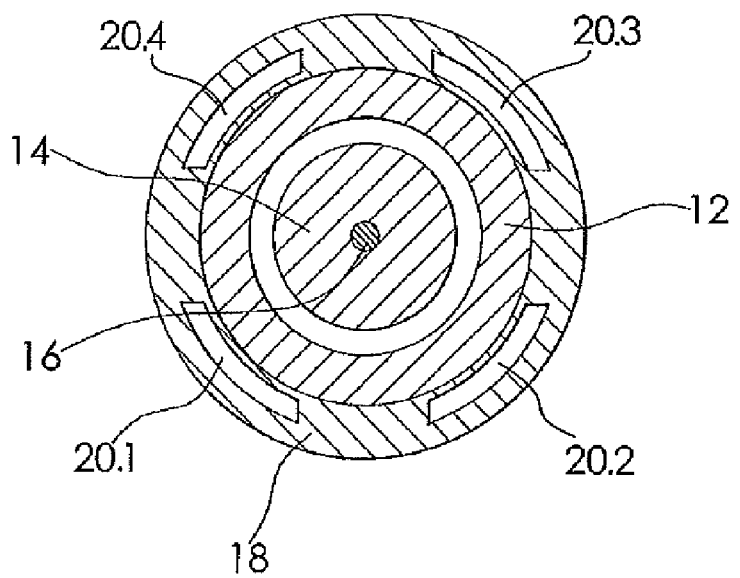
FIG. 2 is a side cross sectional view of the stator assembly illustrated in FIG. 1 taken along line 2-2.

FIGS. 1 and 2 show a stator assembly 10 in accordance with an embodiment of the invention. The stator assembly 10 is adapted to be used in a motor (not shown).

The stator assembly 10 includes a cylindrical hollow main body portion 12 having a longitudinal axis X. In the embodiment shown, the main body portion 12 is formed from an iron alloy. It is understood that other materials can be used to form the main body portion 12 without departing from the scope and spirit of the invention. The main body portion 12 is disposed around a rotor assembly 14 which is coupled to a driven member (not shown) such as a traction drive, a pump impeller, or a compressor impeller, for example, by a shaft 16.

The stator assembly 10 also includes a cooling jacket 18 disposed around and in thermal communication with the main body portion 12. In the illustrated embodiment, the cooling jacket 18 is formed from aluminum. However, other materials can be used to form the cooling jacket 18 as desired. The cooling jacket 18 includes a plurality of fluid conduits 20 formed therein. As a nonlimiting example, the plurality of fluid conduits 20 may include a first fluid conduit 20.1, a second fluid conduit 20.2, a third fluid conduit 20.3, and a fourth fluid conduit 20.4 as shown in FIG. 2. In the embodiment shown, the fluid conduits 20 are formed substantially parallel to the longitudinal axis X of the main body portion 12. It is understood that the fluid conduits 20 can be formed between the cooling jacket 18 and the main body portion 12 or otherwise, and can be formed in different directions and orientations as desired. The fluid conduits 20 are adapted to receive a coolant (not shown) from a source of coolant (not shown) therein.

A first end plate 22 is disposed on a first end 24 of the stator assembly 10. The first end plate 22 forms a substantially fluid tight seal with the first end 24 of the stator assembly 10. A pair of apertures (not show) is formed in the first end plate 22 for receiving one of an inlet fitting 23 and an outlet fitting 25 therein. The fittings 23, 25 are in fluid communication with the fluid conduits 20 formed in the cooling jacket 18 and the source of coolant. The first end plate 22 also includes a central groove 26 formed in a first surface 28 thereof. The central groove 26 receives a first bearing 30 that rotatably supports the shaft 16. It is understood that the first bearing 30 can be any type of bearing as desired such as an air bearing and a ball bearing, for example. Optionally, one or more coolant channels (not shown) can be formed in the first end plate 22. The coolant channels formed in the first end plate 22 can be in fluid communication with the inlet fitting 23, the outlet fitting 25, and/or the fluid conduits 20 formed in the cooling jacket 18 as desired.

A second end plate 32 is disposed on a second end 34 of the stator assembly 10. The second end plate 32 forms a substantially fluid tight seal with the second end 34 of the stator assembly 10. The second end plate 32 includes a central groove 36 formed in a first surface 38 thereof adapted to receive a second bearing 40 that rotatably supports the shaft 16. It is understood that the second bearing 40 can be any type of bearing as desired such as an air bearing and a ball bearing, for example. A central aperture (not shown) is formed in the second end plate 32. The shaft 16 extends through the central aperture to the driven member. Optionally, one or more coolant channels (not shown) can be formed in the second end plate 32. In this case, the fluid conduits 20 formed in the cooling jacket 18 would extend to the second end 34 of the stator assembly 10 and be in fluid communication with the coolant channels formed in the second end plate 32.

To produce the stator assembly 10, a mold (not shown) for the cooling jacket 18 is disposed around the main body portion 12 and the cooling jacket 18 is cast directly over the main body portion 12. As the cooling jacket 18 is being molded, the fluid conduits 20 are injection molded into the cooling jacket 18. It is understood that the cooling jacket 18 can be formed prior to disposal over the main body portion 12 as desired. It is also understood that the fluid conduits 20 can be formed in the cooling jacket 18 subsequent to the molding of the cooling jacket 18 as desired. It is further understood that the mold for the cooling jacket 18 may include structure for forming the fluid conduits 20 as desired.

The main body portion 12 and the cooling jacket 18 are disposed around the rotor assembly 14 and the shaft 16. The first end plate 22 including the first bearing 30 is sealed to the first end 24 of the stator assembly 10 and the shaft 16 is rotatably secured in the first bearing 30. It is understood that the first end plate 22 can be sealed to the first end 24 of the stator assembly 10 by any means, such as with tie rod screws (not shown), for example. The inlet fitting 23 and the outlet fitting 25 are disposed in the apertures formed in the first end plate 22 to communicate with the fluid conduits 20 formed in the cooling jacket 18.

The shaft 16 is inserted through the central aperture formed in the second end plate 32. The second end plate 32, including the second bearing 40, is sealed to the second end 34 of the stator assembly 10, and the shaft 16 is rotatably secured in the second bearing 40. It is understood that the second end plate 32 can be sealed to the second end 34 of the stator assembly 10 by any means, such as with tie rod screws (not shown), for example.

In use, the shaft 16 is coupled to the driven member. A magnetic field is generated by the stator assembly 10, which causes the rotor assembly 14 and the shaft 16 to rotate about the longitudinal axis X of the main body portion 12. The rotation of the rotor assembly 14 and shaft 16 is transferred to the driven member. Heat is produced during operation of the stator assembly 10. Coolant from the coolant source is caused to flow into the inlet fitting 23 and through the first end plate 22 into the fluid conduits 20 formed in the cooling jacket 18. The coolant absorbs heat energy from the main body portion 12 to cool the main body portion 12. If coolant channels are formed in the endplates 22, 32, coolant flowing therethrough can be used to cool the first end 24 and the second end 34 of the stator assembly 10. The coolant then flows out of the stator assembly 10 through the outlet fitting 25. The coolant can be recirculated between the coolant source and the fluid conduits 20 formed in the cooling jacket 18 to maintain the temperature of the stator assembly 10 within a desired range.

Figure 3:
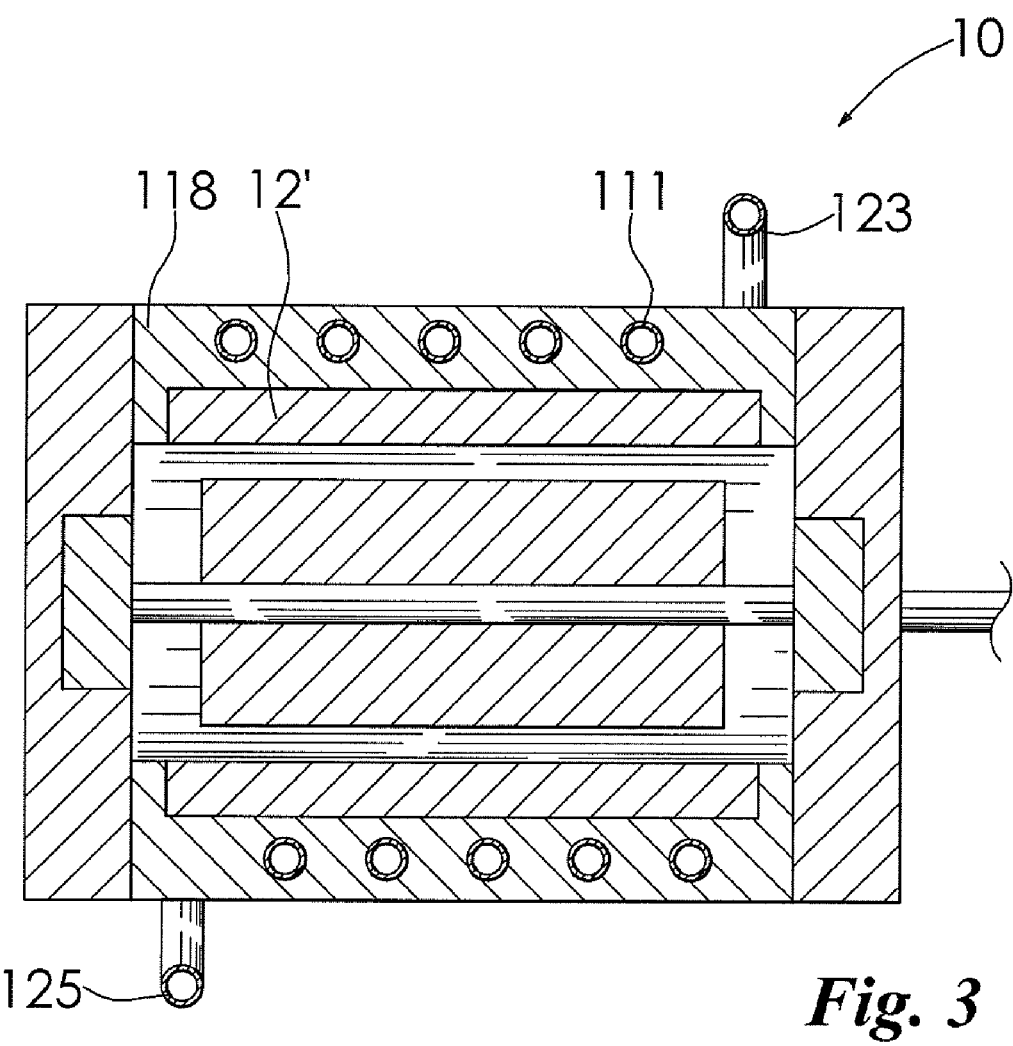
FIG. 3 is a front sectional view of a stator assembly in accordance with another embodiment of the invention.

FIG. 3 shows a stator assembly 110 in accordance with another embodiment of the invention. Similar structure discussed above for FIGS. 1 and 2 includes the same reference numeral followed by a prime "'" symbol. A conduit 111 is disposed in a mold (not shown) for forming a cooling jacket 118. In the embodiment shown, the conduit 111 is formed from a stainless steel alloy. It is understood that other materials may be used to form the conduit 111, such as an aluminum alloy or brass, for example. The conduit 111 includes a fluid inlet 123 and a fluid outlet 125 in fluid communication with a source of coolant. Although the conduit 111 is shown, as a helically wound coil, other conduit shapes and flow patterns can be used as desired.

To form the cooling jacket 118, the conduit 111 is disposed around a main portion 12' of the stator assembly 110. The cooling jacket 118 is molded around the conduit 111. The fluid inlet 123 and the fluid outlet 125 are then connected to the source of coolant to provide fluid communication between the source of coolant and the conduit 111. The remaining assembly process for the stator assembly 110 is substantially the same as described above for FIGS. 1 and 2.

In use, the stator assembly 110 is coupled to a driven member (not shown) as described above for FIGS. 1 and 2. A magnetic field is generated by the stator assembly 110 which results in the generation of heat. Coolant from the coolant source is caused to flow through the conduit 111. The coolant absorbs heat energy from the main body portion 12'. The coolant can be recirculated between the coolant source and the piping 111 disposed in the cooling jacket 118 to maintain the temperature of the stator assembly 110 within a desired range.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A stator assembly for use in a fluid-cooled motor comprising:
   a hollow main body having a first end and a second end and adapted to receive a rotor therein, the hollow main body having a longitudinal axis;
   a cooling jacket disposed around the main body, wherein the cooling jacket has an inner recess in which the main body is disposed, the main body abutting an entirety of the inner recess of the cooling jacket,
   a first end plate disposed on the first end of the main body, the first end plate having a first central groove formed in a first inner surface thereof, the first end plate having an inlet fitting and an outlet fitting;
   a second end plate disposed on the second end of the main body, the second end plate having a second central groove formed in a second inner surface thereof, wherein the cooling jacket is disposed between the main body and each of the first end plate and the second end plate;
   a first bearing disposed in the first central groove;
   a second bearing disposed in the second central groove, the first bearing and the second bearing configured to support a shaft along the longitudinal axis of the main body, wherein the second end plate has a central aperture formed in the second central groove through which the shaft extends; and a plurality of non-helical, linear conduits entirely enveloped by the cooling jacket, the plurality of linear conduits disposed radially outwardly from the longitudinal axis of the main body and adapted to receive a coolant therein, the plurality of linear conduits including a first conduit disposed along a length of the cooling jacket and oriented substantially parallel with the longitudinal axis of the main body, and a second conduit disposed along the length of the cooling jacket and oriented substantially parallel with the longitudinal axis of the main body, the first conduit in fluid communication with the second conduit, the first conduit in fluid communication with the inlet fitting and the second conduit in fluid communication with the outlet fitting, wherein each of the plurality of non-helical, linear conduits having has an arcuate cross-sectional shape including an arcuate upper surface and an arcuate lower surface, the arcuate upper surface longer than the arcuate lower surface, the arcuate upper surface corresponding substantially to a curvature of an adjacent portion of an outer surface of the cooling jacket, and the arcuate lower surface corresponding substantially to a curvature of an adjacent portion of an outer surface of the main body, wherein a cross-section providing the arcuate cross-sectional shape is taken in a direction transverse to the longitudinal axis of the main body, and wherein a thickness of the cooling jacket between each of the lower surfaces of the plurality of conduits and the outer surface of the main body is substantially constant.

2. The stator assembly according to claim 1, wherein at least one of the first end plate and the second end plate includes coolant channels formed therein and in fluid communication with at least one of the inlet fitting, the outlet fitting, and the conduit in the cooling jacket.

3. The stator assembly according to claim 1, wherein the main body is formed from iron and the cooling jacket is formed from aluminum.

4. The stator assembly according to claim 1, wherein the conduit is formed from at least one of a stainless steel alloy, an aluminum alloy, and brass.

5. The stator assembly according to claim 1, wherein the plurality of conduits includes a third conduit substantially parallel with the longitudinal axis of the main body, and a fourth conduit substantially parallel with the longitudinal axis of the main body, the first conduit, the second conduit, the third conduit, and the fourth conduit substantially evenly spaced apart from one another within the cooling jacket.

6. The stator assembly according to claim 5, wherein the third conduit is in fluid communication with the fourth conduit, the third conduit is in fluid communication with the inlet fitting, and the fourth conduit is in fluid communication with the outlet fitting.

* * * * *